Feb. 7, 1933.     C. E. BREADEN     1,896,281
EVEN BALANCE SCALE
Filed Oct. 21, 1930     5 Sheets-Sheet 2

INVENTOR
C. E. Breaden
BY ATTORNEY

Feb. 7, 1933.   C. E. BREADEN   1,896,281
EVEN BALANCE SCALE
Filed Oct. 21, 1930   5 Sheets-Sheet 3
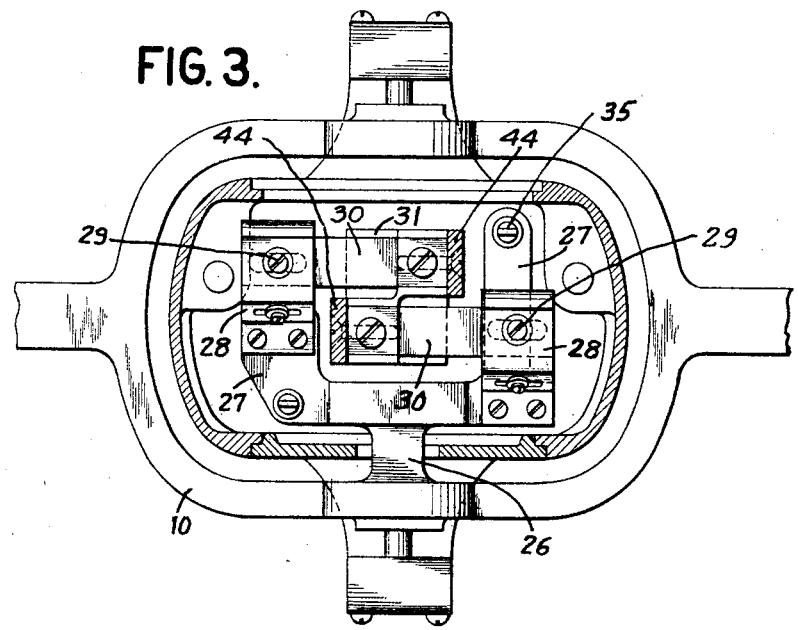
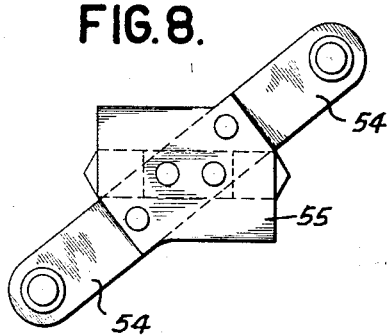
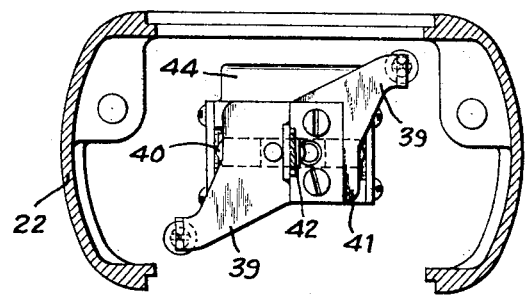
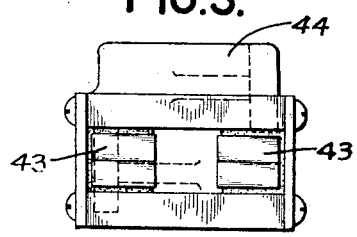

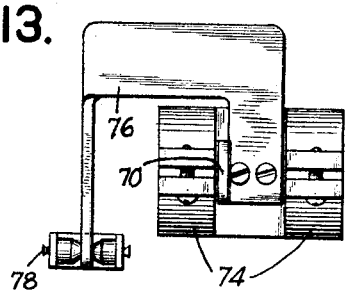
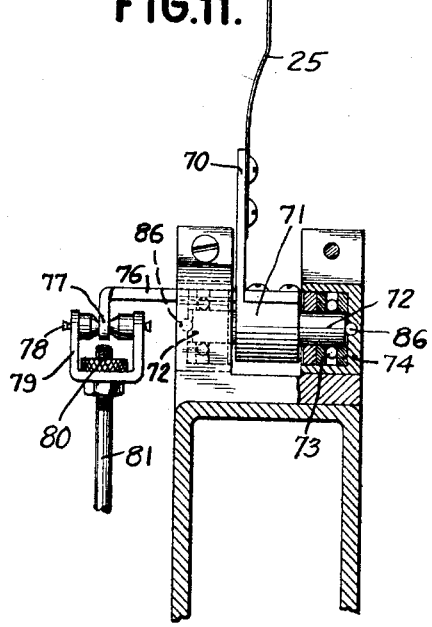
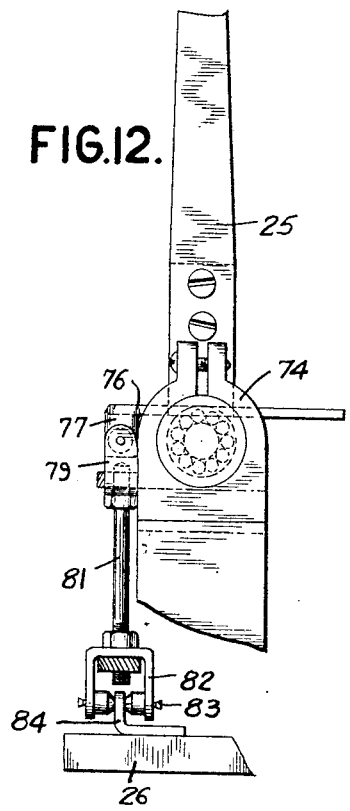

Feb. 7, 1933. C. E. BREADEN 1,896,281
EVEN BALANCE SCALE
Filed Oct. 21, 1930 5 Sheets-Sheet 5

INVENTOR
C. E. Breaden
BY his ATTORNEY
W M Wilson

Patented Feb. 7, 1933

1,896,281

UNITED STATES PATENT OFFICE

CARROLL E. BREADEN, OF DAYTON, OHIO, ASSIGNOR TO DAYTON SCALE COMPANY, OF DAYTON, OHIO, A CORPORATION OF NEW JERSEY

EVEN BALANCE SCALE

Application filed October 21, 1930. Serial No. 490,128.

This case relates to weighing scales of the even balance type.

The object of the invention is to provide a novel connection between the even balance beam and the indicator whereby the latter may move transversely to the beam and in proportion to the movements of the beam.

More specifically the object is to provide such a mechanism in a scale of the even balance type which is provided with spring counter balancing devices to automatically offset loads on the platforms of the beam.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 3 is a section on line 3—3 of Fig. 1.

Fig. 4 is a section on line 4—4 of Fig. 1.

Fig. 5 is a detail of the bearing for the indicator.

Figs. 8 and 9 are details of another modification of the driving connection between the beam and the indicator.

Fig. 10 is a detail of still another modification.

Figs. 11, 12 and 13 are details of still another modification; and

Figure 14:
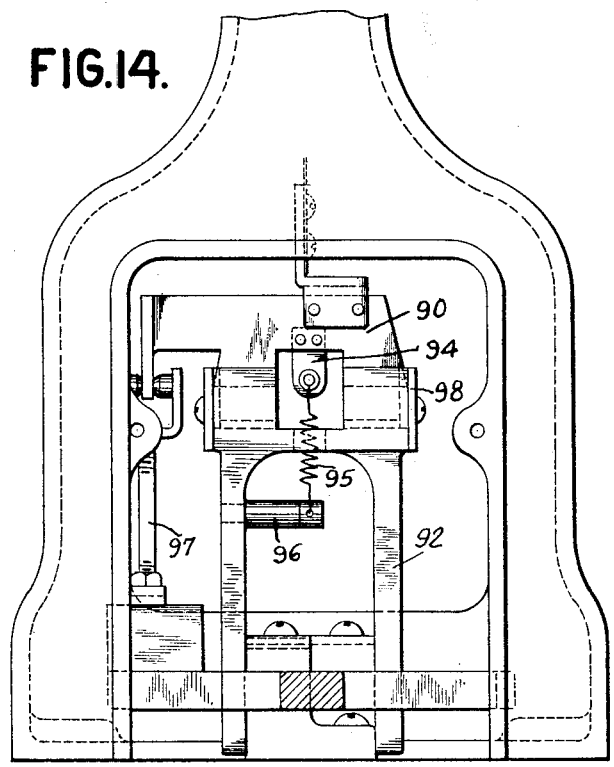
Figure 15:
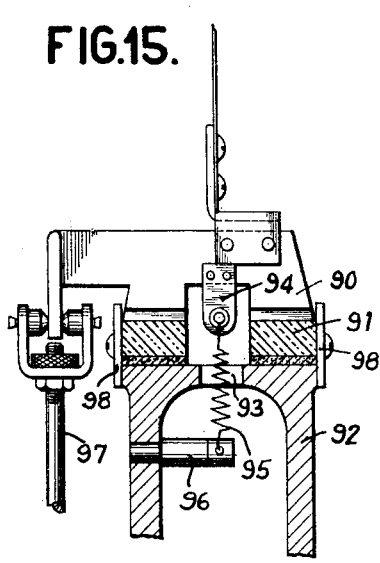
Figure 16:
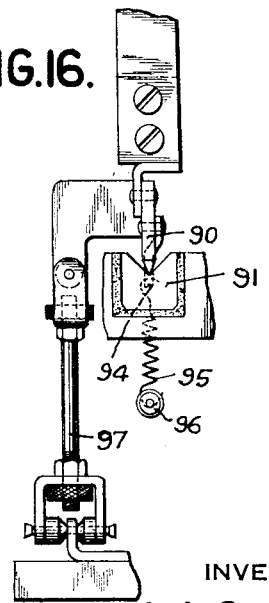

Figs. 14, 15, and 16 are detail views showing the preferred modification.

Referring to the form shown in Figs. 1 to 5, the scale comprises a beam 10 fulcrumed intermediate its ends by means of knife edges 11 resting in agate bearings 12 carried by the frame 13. On each end of the beam is pivotally supported a pan 14 with which are rigidly joined depending stems 15, the lower ends of which are connected to check rods 16 pivoted to the frame rod 17 at 18. Thus the beam 10, pans 14 and check rods 16 form the usual lever arrangement of the even balance scale.

A dash pot 19 is connected to one arm of the beam to limit the oscillations thereof and the usual tare beam 20 is fastened to the beam to cooperate with a poise 21. The beam 10 is bifurcated at its central portion and between the furcations of the beam the frame 13 carries an upright tower 22 having at its upper end windows 23 through which are visible charts 24 having the zero point in the center and cooperating with the pointer 25. To counter balance movements of the beam, the latter has one of its furcations provided with an extension 26 transverse to its length and which extends inside tower 22. Extension 26 is bifurcated at its free end, each arm 27 carrying adjustably a plate 28 provided with a screw 29 which bears on a flat leaf spring 30 anchored at one end to a lug 31 secured to the frame piece 13. The movement of the beam in a clockwise direction, as viewed in Fig. 1, will be resisted by the right hand spring 30 acting on the associated screw 29, while the movement of the beam counterclockwise is resisted by the left hand spring 30 and its associated screw 29.

The counterbalancing mechanism above described is disclosed and claimed in the copending application Serial No. 445,334, filed by me April 18, 1930.

By means of the present invention it is proposed to mount the indicator 25 independently of the beam and swing it transversely to the beam but in proportion thereto. In order to accomplish this the bifurcated arms 27 of extension 26 of the beam have pivoted thereto the lower ends of connecting members 35. The members 35, as may be seen from Fig. 3, are spaced longitudinally of the beam and are located on opposite sides of the beam fulcrum similarly to the screws 29 carried by the arm 27 and at the same time are also spaced transversely of the beam at equal distances from the longitudinal axis thereof. Members 35 are threadedly connected to screws 36 which in turn are threaded into stirrups 37 hooked to spring 38 connected to arms 39 extending oppositely from the fulcrum 40 on the frame 41 to which is secured the aforementioned pointer 25. The knife edge 40 rests within the groove of agate blocks 43 mounted in a bifurcated standard 44 carried by the lug 31 (see Figs. 1 and 3).

Figure 1:
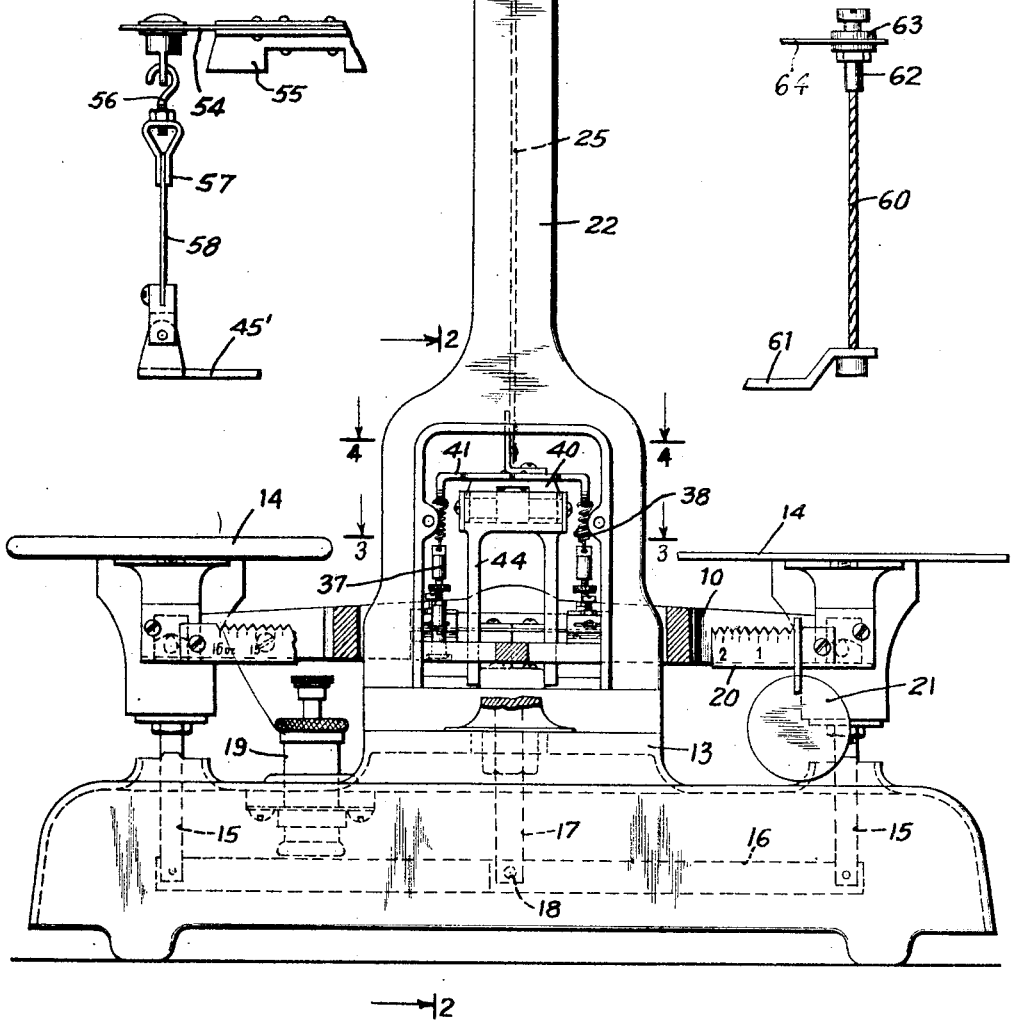
Fig. 1 is a front view of the scale.
Figure 2:
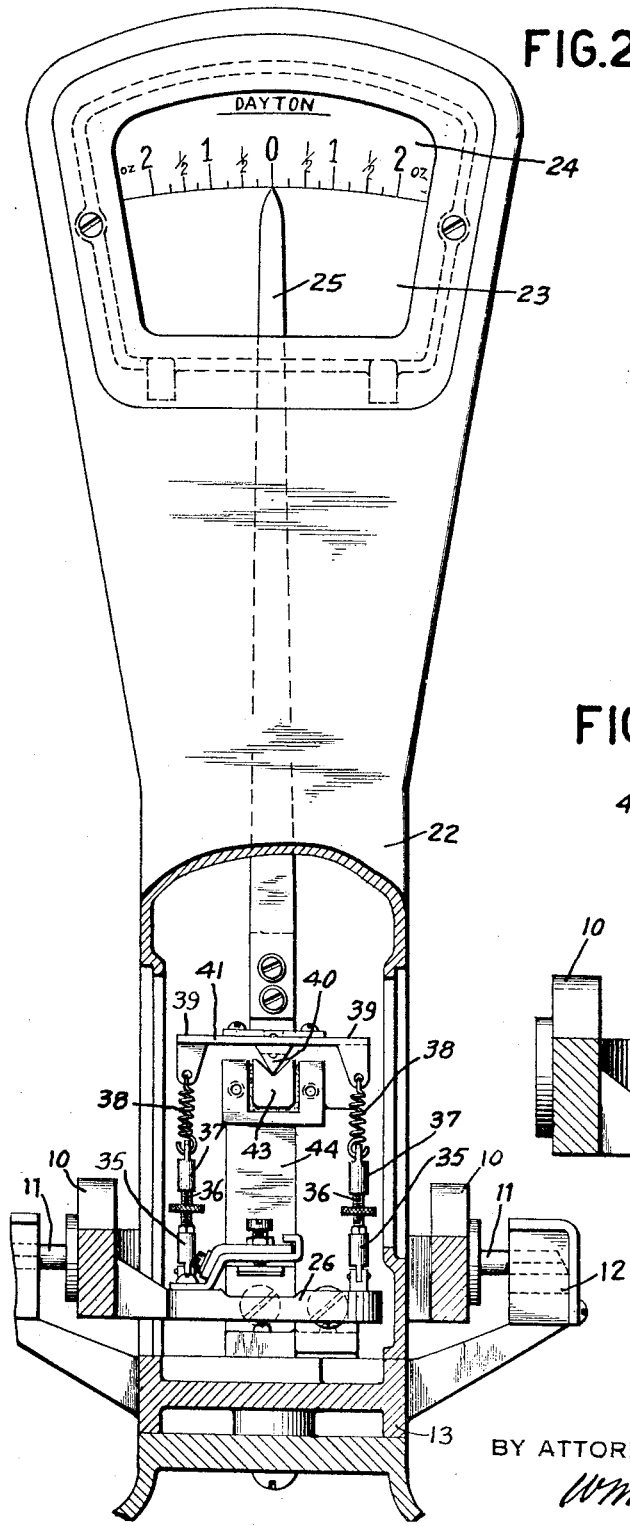
Fig. 2 is a view at right angles to Fig. 1 with the lower part in section.

When a load is placed on the right hand pan 14, as viewed in Fig. 1, the corresponding right hand arm 27 and the member 35 secured to said arm will be lowered. The member 35 will therefore pull down on the right hand arm 39, as viewed in Fig. 4, of the indicator frame 41 or the left hand arm 39, as viewed in Fig. 2. At the same time the left hand arm 27, as viewed in Fig. 1, will move upwardly effecting a corresponding movement of the left hand arm 39 of the indicator frame 41. In this manner the frame 41 will be swung on its fulcrum 40 at right angles to the movement of the beam. In a similar way, when the load is placed on the left hand pan 14, as viewed in Fig. 1, to over balance the beam in a clockwise direction, the indicator 25 will swing to the right, as viewed in Fig. 2. It will be noted that the members 27, 35, 37, 38, and 39 are pivotally connected to provide a universal alining movement.

The springs 30 absorb the shock of transmission between beam 10 and the indicator structure at the same time that they hold the indicator firmly in its bearings 43. A zero adjustment may be effected by means of adjustable threaded members 36.

Figure 7:
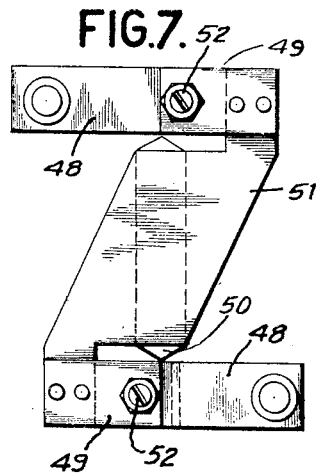
Fig. 7 is a top view of Fig. 6.
Figure 6:
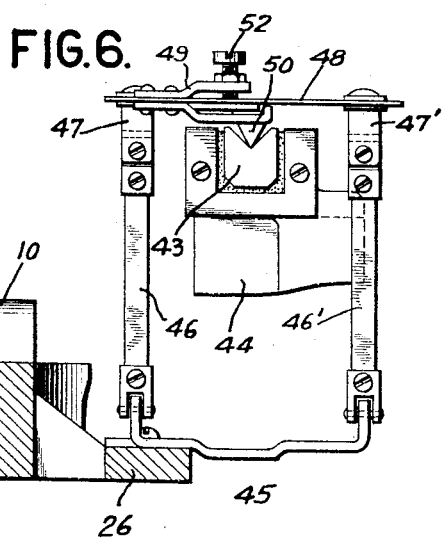
Fig. 6 is a detail of a modified form of connection between the beam and the indicator.

In the modification shown in Figs. 6 and 7, the extension 26 of the beam has secured thereto a U-shaped plate 45 of substantially the same shape as the offset arms 27 shown in Fig. 3. Secured to member 45 are the offset tapes 46 and 46', the upper ends of which are secured to members 47 and 47' respectively, connected to flat spring strips 48 carried by arms 49 extending from opposite sides of the knife edge 50 of the indicator frame 51, as shown in Fig. 7.

The tension exerted by the springs 48 on tape 46 or 46' is adjustable by means of screws 52 threaded into the arms 49 and bearing on the spring strips 48. The latter are in effect equivalent to the arms 39 while the tapes 46 are equivalent to members 35, 36 and 37 of the first modification. Thus the movement of the beam would effect a corresponding movement of the tapes 46 or 46' to move the spring strips 48 in proportion to the movement of the beam and transversely thereof.

The modification shown in Figs. 8 and 9 differs from the previous modifications in providing a connection between the beam and indicator consisting of arms 54 of spring metal extending from opposite diagonal sides of indicator frame 55 and adjustably connected by threaded hooks 56 to a hanger 57 fastened to the tape 58 secured to member 45' carried by beam extension 26. The operation of this modification is the same as that of the above described modifications.

Fig. 10 shows still another modification in which the connection between the beam and the indicator includes the vertical member 60 made of flexible braided wire connected at the lower end to arm 61 carried by beam extension 26 and having its upper end adjustably connected by a tubular member 62 to a ring 63 carried by the tape 64 forming one arm of the indicator frame. By using braided wire a fairly rigid connection is made between the beam and the indicator frame while at the same time a slight resiliency is permitted to absorb the shock of transmission from the beam to the indicator.

Figs. 11, 12 and 13 show a modification of the invention in which only a single link connection between the even balance beam and the indicator frame is provided. In this modification the indicator is fixed to a member 70 which is enlarged at its lower end to form a hub 71. Extending from each side of said hub is a short shaft 72 which is journalled in a ball race 73 carried by the frame 74. Rigid with the hub 71 is a horizontally extending arm 76 extending first in the direction of the beam and then bent at its outer end 76' to extend horizontally in the direction of the fulcrum of the beam. The free end of the extension 76' is downwardly bent to form a lug 77 through which is inserted a pin 78. Pivotally suspended from said pin is a U-shaped member 79 to which is adjustably attached by threaded means 80 a link 81. The lower end of the link 81 is similarly adjustably carried by a U-shaped member 82 which is pivotally attached by a pin 83 to a bracket 84 carried by the beam extension 26. The pivotal connections at 82 and 78 are at right angles to each other thus permitting universal pivotal motion between the beam extension 26 and the indicator extension 77. Each side of the frame 74 has a ball 86 imbedded therein which is in engagement with the adjacent end of the stud shaft 72 thus preventing endwise movement of said shaft and the indicator carried therewith.

In operation, when the beam moves, it moves the link 81 in the same direction and through the arms 76' and 76 causes the indicator 25 to move at right angles to the movement of the beam. The ball bearing seat for the indicator hub 70 serves to prevent the indicator from moving out of its seat upon upward movement of the link 81. The link 81 may be connected to whichever arm of the beam is found convenient and will serve to positively transmit the motion of the beam to the indicator when the beam moves in either clockwise or counterclockwise direction.

In Figs. 14 to 16, the same link connection as shown in Figs. 11 to 13 is used between the indicator and the beam. In this case, however, the indicator is fixed to a knife edge member 90 which is seated in an agate bearing 91 carried by the frame 92. The frame 92 has a central opening 93 and the bearing members 90 and 91 are bifurcated above said opening to accommodate a stirrup member 94 attached at its upper end to the knife edge member 90 and at its lower end hooked to a spiral spring 95 which at its lower end is fastened to the lug 96 rigidly carried by the frame 92. Thus in this modification the spring 95 serves to hold the knife edge member and indicator firmly in its seat even though the beam moves in a direction to force the link 97 in an upward direction. To prevent endwise movement of the knife edge 90 the frame 92 has thrust plates 98 fixed thereto at each side of the knife edge.

While the several modifications shown and described herein are the preferred forms of the invention it will be understood that other modifications may be devised within the scope of the invention without departing therefrom and it is therefore desired to be limited only by the following claims.

I claim:

1. A scale of even balance type comprising an even balance beam, an indicator movable transversely thereof, and a plurality of connections spaced transversely and longitudinally of the beam for connecting the beam to the indicator whereby the latter is moved proportionally to but transversely to the movement of the beam.

2. In a scale of the even balance type, an even balance beam, an indicator movable transversely to the movement of the beam, an arm on the indicator, an associated arm on the beam extending at right angles to the indicator arm, and a vertical connection between the two including a resilient shock absorbing member the connection between the indicator and the beam effecting movement of the indicator at right angles to the movement of the beam.

3. In a scale of the even balance type, an even balance beam, an indicator fulcrumed at right angles to the pivot of the beam, a pair of arms provided on the beam, a pair of associated arms provided on the indicator, and connections between the arms whereby the indicator is moved at an angle to the beam but in proportion thereto.

4. In a scale of the even balance type, a beam fulcrumed intermediate its ends, an indicator frame pivoted independently of the beam, a spring member provided on the indicator frame extending in a substantially horizontal plane, and a connection from the beam to said member for moving the indicator proportionally to the beam.

5. In a scale such as described in claim 4, said connection from the beam to the indicator including a tape secured at its lower end to the beam and at its upper end to the spring member.

6. A scale such as described in claim 4, and means for adjusting the tension exerted by said spring member on the connection therefrom to the beam.

7. In a scale of the even balance type, a beam having a central loop, an indicator extending along a line passing through said loop and operated by the beam, and a bifurcated stand located within the loop on which the indicator is carried.

8. In a scale of the even balance type, a beam, a counterbalancing device for the beam, a frame lug to which the device is secured, an indicator operated by the beam, and a support for the indicator including a bifurcated member straddling said frame lug and secured thereto.

9. In a scale of the even balance type, a beam, an indicator swingable on an axis transverse of the beam, an arm associated with the indicator and extending obliquely in a horizontal direction to the axis of the indicator, and operating connections from the beam to said arm.

10. In a scale of the even balance type, a beam, a chart, an indicator coacting with said chart and movable transversely of the beam, and adjustable operating connections between the beam and indicator including shock absorbent means to set the indicator at the desired index point of said chart.

11. In a scale of the even balance type a rockingly mounted beam, an indicator pivoted independently of the beam to move transversely thereto, transmitting connections between the beam and the indicator to move the latter proportionally to the beam, a support for pivotally mounting the indicator, and means for holding the indicator to its support throughout the entire range of movement of the beam, said last named means comprising a spring member fixed at one end to the indicator and at its other end to a stationary part of the scale.

12. In a scale of the even balance type a rockingly mounted beam, an indicator pivoted independently of the beam to move transversely thereto, transmitting connections between the beam and the indicator to move the latter proportionally to the beam, a support for pivotally mounting the indicator, and means for holding the indicator to its support throughout the entire range of movement of the beam, said last named means comprising a helical spring member fixed at its upper end to the indicator and at its lower end to a stationary part of the scale, said spring being in a vertical line directly alined with the pivotal axis of the indicator and at a point midway between the longitudinally spaced ends of said pivotal axis.

13. In a scale, a pivotally mounted beam, an indicator movable transversely to the beam, and a pair of connections from the beam to the indicator, the connections being longitudinally spaced of the beam one to each side of the beam pivot, and the connections being also spaced transversely of the beam.

14. In a scale, a beam, a registering element, and an operating connection therebetween including a shock absorbing member and means for adjusting the effect of said member.

15. In a scale, a beam, a registering element, and an operating connection therebetween including a resilient shock absorbing member and means for adjusting the resiliency of said member.

In testimony whereof I hereto affix my signature.

CARROLL E. BREADEN.